UNITED STATES PATENT OFFICE.

SAMUEL CABOT, OF CANTON, MASSACHUSETTS, ASSIGNOR TO SAMUEL CABOT, INC., A CORPORATION OF MASSACHUSETTS.

VARNISH AND PROCESS OF MAKING SAME.

1,413,964.                       Specification of Letters Patent.   Patented Apr. 25, 1922.

No Drawing.           Application filed November 1, 1919.   Serial No. 334,914.

*To all whom it may concern:*

Be it known that I, SAMUEL CABOT, a citizen of the United States, residing at Canton, county of Norfolk, Commonwealth of Massachusetts, have invented certain new and useful Improvements in Varnishes and Processes of Making Same, of which the following is a specification.

My present invention relates to varnishes, japans and the like, and particularly to the production of such materials without the use of the usual turpentine, rosin or gums. My invention involves the development by polymerization of a gummy body from a drying oil in a thinner which constitutes at once a coagulant deterrent during polymerization and an ultimate thinner in the resultant varnish.

The production of polymerized masses from tung oil, linseed oil and other drying oils has been heretofore effected, but the product has been a thick, sticky, jellylike mass, substantially insoluble in ordinary commercial solvents. To avoid this, polymerization with rosin has been attempted, but even this resultant remains thick and sticky even though liquid, and has the further disadvantage of containing rosin as an adulterant with its undesirable properties.

In addition to the tendency of polymerized oil to go into a thick and insoluble state, there is also a tendency of the oil to oxidize. The oil on oxidizing goes into a state very similar to this, and in fact, this oxidizing is sometimes confused with polymerizing. The oxidized oil tends to shrink and to become crumbly and brittle. Whether the oxidized oil be in merely a gummy state or in a brittle state, it is practically insoluble from a commercial standpoint and in its brittle state is highly undesirable in any such product as varnish. It is therefore extremely important to secure polymerized oil free from oxidized oil. It is also and usually for the same reason highly important that the polymerized oil be kept free from any adulterant and for this reason rosin as a solvent is undesirable in the polymerized oil.

The object of my invention is to develop a suitable body for a varnish by so controlling the polymerization that the resultant has all the characters necessary for the body of a varnish and yet at the same time is in solution in a convenient commercial form. Commercially my invention involves the development of this body in a thinner or solvent in such a manner that the gummy body of the product is in a state of solution and not in a sticky, tough or gummy condition, and secondly, that the resultant with the addition of a drier is in itself a complete varnish or with additions of pigment may be modified into an enamel or other finish.

As illustrative of my invention I will describe a varnish and the method of making the same, both the article and the process being of practical and commercial character. Such a varnish may be made from 33% tung oil, 66⅔% coal tar distillate, substantially free from naphthalene and boiling above 150° C. This distillate should be free from organic bases and phenols if a light colored varnish is required. To this I add ⅓% of litharge as a drier.

This mixture is heated to the initial boiling point of the coal tar distillate in a retort (preferably connected with a reflux condenser) or in a sealed receptacle under pressure, so that none of the solvent is lost. The heating is continued until all of the tung oil has been polymerized. This is usually accomplished in approximately sixty hours. The mass is then allowed to cool and may be clarified in any suitable manner.

The consistency may be varied by adding any other desired ingredients consistent with the usual practice in varnish making or pigments may be ground in it to produce enamels or paints if such be desired.

It will be noted that the distillate has an initial boiling point above 150° C. A number of different distillates may be used such as coal tar hydrocarbons, phenols, petroleums, terpenes, etc. but practice has shown that each distillate is required in mixture with the tung oil in different proportions to prevent gelatinization during polymerization. These if present in sufficient quantity will entirely prevent the coagulation of the tung oil and the solution will remain liquid at ordinary temperatures.

Varnish or other products so made if spread in a thin layer will dry to a brilliant, transparent and elastic film, and if proper quantities of suitable drier are added, will set with a considerable degree of rapidity.

Such a varnish is neutral and tough. It is free from rosin which having no qualities of durability is not a desirable varnish material. The avoidance of varnish gums is a distinct advantage as such gums are acid in character and not suitable to be mixed with basic pigments.

My product is highly resistant to moisture and heat, up to the boiling point of water, and is also resistant to dilute acids and alkalies. Where the product is desired for insect repellent qualities or to be impervious to decay, suitable materials such as phenols may be added or employed.

Various modifications may obviously be made both in my method and in the resultant article produced, all without departing from the spirit of my invention if within the limits of the appended claims.

What I therefore claim and desire to secure by Letters Patent is:

1. A varnish product consisting of a substantially completely polymerized oil in solution in a volatile solvent.

2. A varnish product consisting of a substantially completely polymerized drying oil in solution in a volatile solvent, and a drier added thereto consisting of an organic salt of a metal soluble in the solvent and having oxygen carrying properties.

3. A varnish product comprising a substantially completely polymerized drying oil in solution in a mixture of hydrocarbons, the polymerized oil being in a liquid solution.

4. A varnish product comprising tung oil highly polymerized substantially without oxidation or decomposition in a coal tar distillate.

5. A varnish product comprising tung oil highly polymerized substantially without oxidation or decomposition in a coal tar distillate, and a drier.

6. A varnish product comprising a drying oil highly polymerized substantially without oxidation or decomposition in a volatile solvent.

7. The process of polymerizing tung oil substantially without oxidation or decomposition and without gelatinization consisting in heating said oil with a volatile dilutent while preventing the loss of the dilutent by distillation or evaporation.

8. The process of polymerizing a drying oil substantially without oxidation or decomposition and without gelatinization consisting in heating said oil with volatile coal tar hydrocarbons while preventing the loss of the dilutent by distillation or evaporation.

9. The process of polymerizing a drying oil consisting in heating said oil under a reflux condenser with a volatile dilutent having a predetermined boiling point whereby to maintain a temperature controlled for the avoidance of decomposition and to prevent oxidation.

10. The process of polymerizing oil substantially without oxidation or decomposition and without gelatinization consisting in heating said oil with a volatile dilutent while preventing the loss of the dilutent by distillation or evaporation.

In testimony whereof I affix my signature in presence of two witnesses.

SAMUEL CABOT.

Witnesses:
F. T. AMBROSE,
GUSTAV I. H. KINKEBUSCH.